United States Patent
Baumoel

(10) Patent No.: US 9,310,236 B2
(45) Date of Patent: Apr. 12, 2016

(54) ULTRASONIC FLOW METER USING REFLECTED BEAMS

(71) Applicant: Joseph Baumoel, Wellington, FL (US)

(72) Inventor: Joseph Baumoel, Wellington, FL (US)

(*) Notice: Subject to any disclaimer, the term of this patent is extended or adjusted under 35 U.S.C. 154(b) by 0 days.

(21) Appl. No.: 14/488,510

(22) Filed: Sep. 17, 2014

(65) Prior Publication Data

US 2016/0076923 A1   Mar. 17, 2016

(51) Int. Cl.
| | | |
|---|---|---|
| H01L 41/09 | (2006.01) | |
| H01L 41/107 | (2006.01) | |
| H01L 41/113 | (2006.01) | |
| G01F 1/66 | (2006.01) | |
| G01F 25/00 | (2006.01) | |
| H02K 7/18 | (2006.01) | |
| H02N 2/18 | (2006.01) | |

(52) U.S. Cl.
CPC .............. *G01F 1/66* (2013.01); *G01F 25/0007* (2013.01); *H02K 7/1823* (2013.01); *H02N 2/185* (2013.01)

(58) Field of Classification Search
USPC ........................ 310/323.01–323.19, 328, 330, 310/335–339, 365, 366, 369
See application file for complete search history.

(56) References Cited

U.S. PATENT DOCUMENTS

| | | | |
|---|---|---|---|
| 2,746,291 A | 5/1956 | Swengel | |
| 3,817,098 A | 6/1974 | Brown | |
| 3,904,274 A * | 9/1975 | Feinleib et al. | 359/295 |
| 4,051,396 A * | 9/1977 | Berlincourt | 310/339 |
| 4,083,225 A * | 4/1978 | Day et al. | 73/19.03 |
| 4,144,752 A | 3/1979 | Lolk | |
| 4,297,607 A | 10/1981 | Lynnworth et al. | |
| 4,480,486 A | 11/1984 | Meisser et al. | |
| 5,105,666 A | 4/1992 | Steinacher | |
| 5,433,117 A | 7/1995 | Taphorn et al. | |
| 5,597,962 A | 1/1997 | Hastings et al. | |
| 5,627,323 A | 5/1997 | Stern | |
| 5,811,689 A | 9/1998 | Collier et al. | |
| 6,026,693 A | 2/2000 | Baumoel et al. | |
| 6,055,868 A | 5/2000 | Koyano et al. | |
| 6,338,277 B1 | 1/2002 | Diston et al. | |
| 6,927,501 B2 * | 8/2005 | Baarman et al. | 290/43 |
| 7,448,282 B2 | 11/2008 | Wiest et al. | |
| 7,911,306 B2 | 3/2011 | Allen | |
| 8,356,522 B2 | 1/2013 | Allen | |
| 8,505,391 B1 | 8/2013 | Baumoel | |
| 2003/0051559 A1 | 3/2003 | Ehrlich et al. | |
| 2005/0139013 A1* | 6/2005 | Hashimoto et al. | 73/861.27 |
| 2006/0119224 A1* | 6/2006 | Keolian et al. | 310/339 |
| 2007/0034016 A1 | 2/2007 | Maginnis et al. | |
| 2007/0186681 A1 | 8/2007 | Shkarlet et al. | |
| 2008/0007142 A1* | 1/2008 | Toda | 310/335 |
| 2008/0236297 A1 | 10/2008 | Fleet et al. | |
| 2009/0019945 A1 | 1/2009 | Matsushita | |
| 2009/0064403 A1* | 3/2009 | Wolfe | 4/504 |

(Continued)

FOREIGN PATENT DOCUMENTS

EP       2725327       4/2014

*Primary Examiner* — Thomas Dougherty
(74) *Attorney, Agent, or Firm* — F. Chau & Associates, LLC

(57) ABSTRACT

An ultrasonic transducer for a pipe includes an ultrasonic source configured to emit a sonic beam and a conically shaped reflector configured to reflect the sonic beam towards an inner wall of the pipe. An apex of the reflector opposite its base is mounted to the ultrasonic source. The conically shaped reflector may have concave outer surfaces that enable the reflector to reflect the sonic beam into waves of a collimated shape.

24 Claims, 17 Drawing Sheets

Reflected Conical Beam Spool Assembly
Electromagnetic Power Generation

(56) References Cited

U.S. PATENT DOCUMENTS

| | | |
|---|---|---|
| 2009/0212665 A1 * | 8/2009 | Koser et al. .................. 310/339 |
| 2009/0230823 A1 * | 9/2009 | Kushculey et al. ........... 310/366 |
| 2012/0206016 A1 * | 8/2012 | Ayazi et al. ................... 310/339 |
| 2014/0144247 A1 * | 5/2014 | Wiest et al. ................. 73/861.31 |

* cited by examiner

Reflected Conical Beam Spool Assembly
Piezoelectric Powered

Reflected Focused Conical Beam Spool

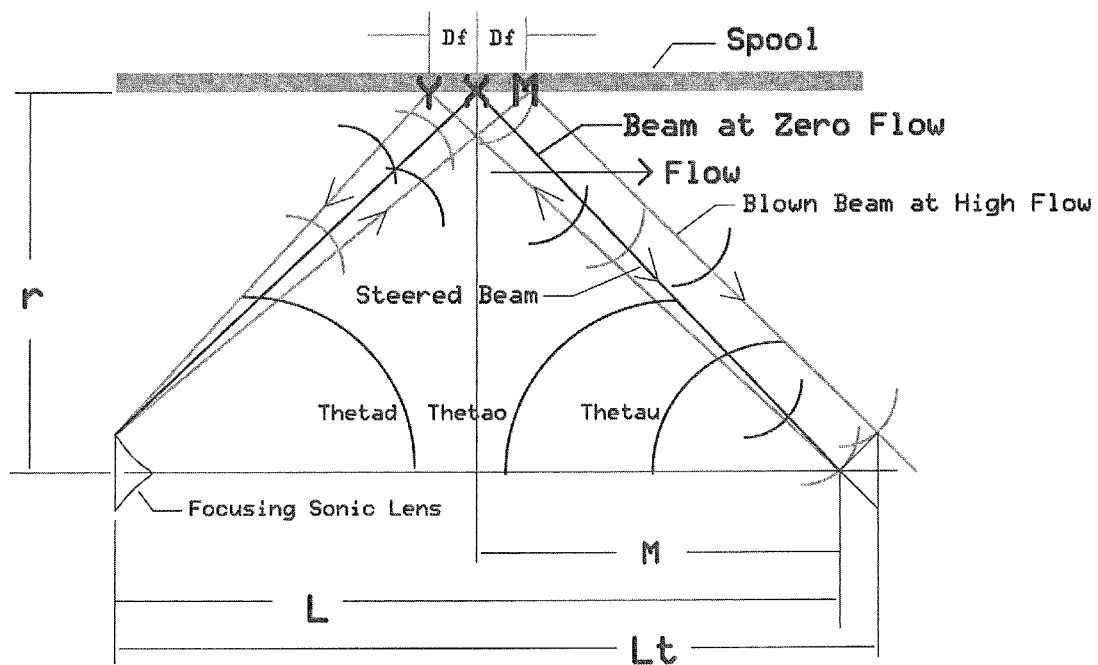

Function Modules

ULTRASONIC FLOW METER USING REFLECTED BEAMS

TECHNICAL FIELD

The present disclosure relates to self powered ultrasonic flowmeters, and more particularly to ultrasonic flowmeters using conically shaped focused beams created by reflection from a sonic lens or by synthesis using a beam steering method

DISCUSSION OF RELATED ART

Various liquids and gases are distributed by suppliers to consumers in both commercial and residential applications, requiring the measurement of these to determine the payment to be made by the consumer to the supplier. Of consummate importance is that the measurement accuracy be accepted by both the supplier and consumer.

Typical of such a situation is the supply of natural gas, oil or water from a utility to a residential or commercial customer. A conventional method of measurement of Natural Gas is via a mechanical device through which the supplied gas flows, and in which gears rotate which drive numerical displays which indicate the amount of product which has been delivered. Such mechanical devices are subject to a wide variety of changes in calibration due to wear and changes in temperature, pressure and humidity. Other mechanical devices, such as turbines, orifice plates and pressure sensors can perform the same function, but are also subject to calibration variation due to similar causes. In particular, the operation of all mechanical devices is subject to friction effects, which can vary over time and affect measurement accuracy.

Unlike mechanical flow meters, Transit Time Ultrasonic flowmeters have no moving parts and therefore friction is not a factor in their operation. Accordingly, Ultrasonic flow meters, of both the Clamp-On and Wetted types, have been used quite successfully in commercial natural gas applications. However, they are subject to other sources of calibration change or error.

A primary source of error in conventional ultrasonic flowmeters is the use of generally narrow sonic beams. Thus, even a multiplicity of sonic beams cannot interrogate the entire cross section of the flow stream. The uncertainty of actual flow in un-interrogated areas of the flow stream due to the unpredictability of the flow profile requires assignment of this uncertainty to the category of error.

SUMMARY OF THE INVENTION

According to an exemplary embodiment of the invention, a Steerable ultrasonic beam is created by a segmented piezoelectric crystal. It is transmitted through a protective interface alternately into a Medium and directed axially, either in the upstream or downstream flow direction. In the case of the Reflect mode operation, it immediately encounters a lens shaped reflector, of higher sonic impedance than that of the Medium. The axis of the Reflector is aligned with the center of the pipe, and therefore in line with the center of the conically shaped beam, which is prevented from spreading by the action of its lens shape, which collimates the beam.

The Reflector directs the cone shaped wave at the inner wall of the pipe, from which it is reflected to a similar Reflector at the opposite end of the pipe. The incident beam is then reflected axially into a like segmented piezoelectric crystal, creating a Receive signal. This signal can be analyzed to determine its time of travel from the time of its Transmission from the opposite side Transducer.

While the Conically-shaped Beam angle can be controlled by the application of time delayed pulses into the segmented Transmit Transducer, to overcome the effects of Beam Blowing, it can be noted that, since there is only reflection in the sonic path, and no entry of the sonic beam into any structure other than the Medium in the pipe, there is no refraction, as there is in Steered Conical Beam Ultrasonic Flowmeters. Accordingly, the angle of the Beam is independent of the sonic propagation velocity of the Medium. Thus, this Flowmeter can be used in its same form for any Medium, liquid or Gas, typically, Water, Oil or Natural Gas, or any Medium whatsoever capable of supporting a sonic beam with the magnitude necessary to deliver a detectable Receive signal under the then current pressure and temperature. The Segmented crystal permits varying the Transmission angle as necessary in accordance with the measured flow velocity to compensate for any effect of flow rate on the angle of both the upstream and downstream Beams as a consequence of Beam Blowing.

The Reflector is for a condition in which the angle is 60 degrees, which is a preferred angle, although any angle that permits the Reflected Beam to engage the Transducer on the opposite side of the pipe spool in like manner, is permissible.

Accordingly, the Reflected Steered Conical Ultrasonic Flowmeter can be considered as a Universal flowmeter, capable of application to any medium, liquid or gas, and any bidirectional flow velocity.

The alternative Synthesized Conic Beam system produces the same result as the Reflect mode system, except that the angle of the beam is determined not only by the time delay between application of transmit pulses to the various crystal segments. However, in this case, the angle is also dependent on the sonic propagation of the medium in the pipe. Accordingly, the use of Beam Steering algorithms is applied to the correction of the resultant beam angle, so as to always be at the angle chosen as nominal, in addition to its use for Beam Blowing correction.

According to an exemplary embodiment of the invention, an ultrasonic transducer for a pipe includes: an ultrasonic source configured to emit a sonic beam; and a conically shaped reflector configured to reflect the sonic beam towards an inner wall of the pipe, wherein an apex of the reflector opposite its base is mounted to the ultrasonic source. In an exemplary embodiment, the ultrasonic source comprises a plurality of electrode segments. In an exemplary embodiment, the electrode segments are arranged in a row. In an exemplary embodiment, the electrode segments include a plurality of concentric ring shaped electrodes surrounding a circular shaped electrode. In an exemplary embodiment, the transducer further includes a control circuit that activates the electrode segments in a predetermined order to cause the ultrasonic source to emit the sonic beam, wherein each next electrode segment is activated after a delay time has elapsed resulting in a controllable sonic beam emission angle. In an exemplary embodiment, all the delays times are the same. In an alternate embodiment, at least two of the delay times are different from one another. In an exemplary embodiment, the order is a sequential order or a non-sequential order.

According to an exemplary embodiment of the invention, an ultrasonic flow meter for a pipe includes: a first transducer having a first ultrasonic source configured to emit a sonic beam and a first conically shaped reflector configured to reflect the sonic beam towards an inner wall of the pipe; and a second transducer having a second ultrasonic source and a second conically shaped reflector configured to reflect the reflected sonic beam towards the second ultrasonic source.

According to an exemplary embodiment of the invention, a flow induced generator for an ultrasonic transducer within a pipe includes: a rotor comprising magnets and outer blades; and a stator comprising internal cores wrapped with coils, and the stator further comprising a protruding shaft, where the shaft passes through a central opening in the rotor. In an exemplary embodiment, the coils are connected to one another in series. In an exemplary embodiment, the coils are wrapped alternately clockwise and counterclockwise.

According to an exemplary embodiment of the invention, a flow induced generator for an ultrasonic transducer within a pipe includes: a flange; a spoke mounted to an inner surface of the flange, wherein the spoke includes a piezoelectric bender that protrudes outside the spoke and a conductive wire connected to the bender. In an exemplary embodiment, a mass is attached to a portion of the bender protruding outside the spoke that acts to oppose a flow of a medium within the pipe. In an exemplary embodiment, the generator includes a cover, wherein an inner surface of the cover entirely surrounds the portion of the bender protruding outside the spoke, and the mass is attached to an outer surface of the cover.

According to an exemplary embodiment of the invention, a method of correcting a delay time used to drive a flow meter located within a pipe is provided. The flow meter has segmented transducers. The method includes: using a control circuit to activate each segment of an upstream transducer of the flow meter according to a first delay time and activate each segment of the downstream transducer according to a second delay time; measuring a parameter of a medium within the pipe using results of the activating of the transducers; comparing the measured parameter to a prior measured version of the same parameter to determine a correction angle; determining an upstream time offset and a downstream time offset based on the angle; adjusting the first delay time with the upstream time offset; and adjusting the second delay time with the downstream time offset. In an exemplary embodiment, the parameter is one of a sonic propagation velocity and a flow velocity, of the medium. In an exemplary embodiment, the upstream time offset and the downstream time offset have a same magnitude but are opposite in sign. In an exemplary embodiment, the steps of the method are repeated a number of times, wherein the time offsets are reduced in magnitude by a certain percentage each time.

BRIEF DESCRIPTION OF THE DRAWINGS

Exemplary embodiments of the invention can be understood in more detail from the following descriptions taken in conjunction with the accompanying drawings in which:

FIGS. 9A, 9B, 9C, 9D, and 9E, and 9F show various methods to adjust the flow meter according to exemplary embodiments of the invention.

DETAILED DESCRIPTION

Figure 1:
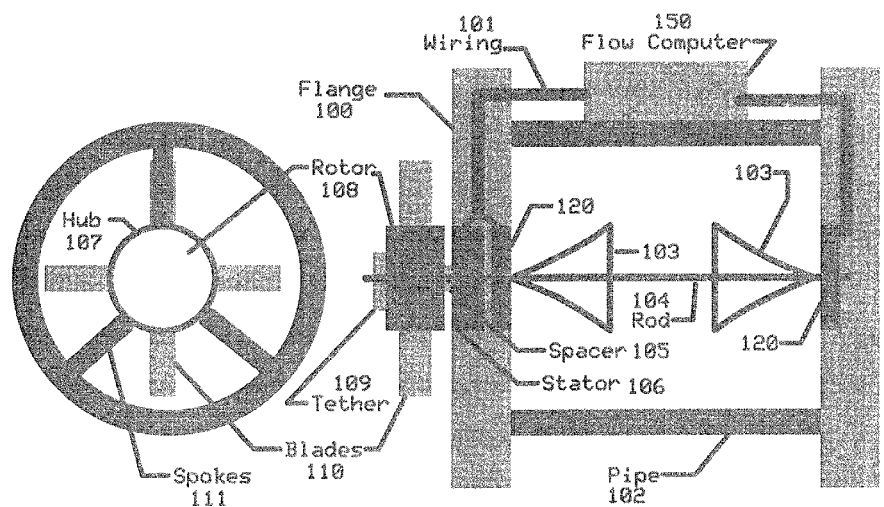
FIG. 1 illustrates a Reflect Mode Conic Beam ultrasonic flow meter Spool employing Electromagnetic means of extracting energy from the flowing stream, according to an exemplary embodiment of the invention.

Exemplary embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Use of a single beam path which is simultaneously capable of interrogating the entire flow profile is preferred over the multiplicity of narrow beam ultrasonic flow beams. Such is accomplished by a conically shaped beam which has its origins in the center of the pipe. Embodiments of the invention present novel means of creating such a conically shaped beam, and applying it to the accurate measurement of flow of gas or liquid, overcoming the unpredictability of the flow profile. In particular, means of creating a conically shaped beam using a lens shaped Reflector, which is not subject to beam angle change due to variation of the medium's sonic propagation velocity, is described. And where Beam Blowing is a potential source of error, Beam Steering can be used to compensate for this cause of change in the beam angle.

Secondly, a means of synthesizing a conically shaped beam by utilizing Beam Steering is also described, where the same Beam Steering algorithms can be used to correct for variation of the angle of the conically shaped beam due to variation of the sonic propagation velocity of the gas or liquid medium. This would prevent calibration error that would be caused by such a change in the beam angle.

Among the other remaining sources of error is Beam Blowing, especially in cases where the flow rate appreciably approaches the sonic velocity at which natural gas propagates. Beam Blowing blows both the Upstream and Downstream sonic beams away from the fixed position of the respective Receive transducer. Accordingly, the use of a Beam Steering method is a preferred facility, to correct the angle of the sonic beams where such Beam Blowing could be encountered.

But, to construct a viable flowmeter for Natural Gas applications it is necessary to recognize the advantage that the current mechanical flowmeters provide, in that they do not require use of external electrical power. Power, if used, raises questions of safety from explosion due to the presence of explosive vapors in the vicinity of the flowmeter. Accordingly, a flowmeter for such applications must not require external power of the type that requires application of expensive and cumbersome accommodation safety regulations.

Accordingly, the Reflect Mode and Synthesized Conical Beam Ultrasonic Flowmeters provide for the incorporation of means to provide electrical energy derived from the energy of the flow stream itself. This derived energy is sufficient to operate the electronic circuits required for accurate flow measurement, but never approaching a level that reaches or exceeds the limits of the safety regulations.

According to an exemplary embodiment of the invention, a steerable ultrasonic beam is created by a segmented piezoelectric crystal (e.g., see 120 in FIG. 1). The beam is transmitted through a protective interface (e.g., see 119 in FIG. 3) alternately into a Medium and directed axially, either in the upstream or downstream flow direction. In the case of the Reflect mode operation, it immediately encounters a conically shaped reflector (e.g., see first 103 in FIG. 1), of higher sonic impedance than that of the Medium. The reflector may be somewhat lens shaped, where all outer surfaces of the reflector are concave. The axis of the Reflector is aligned with the center of the pipe (e.g., see 102 in FIG. 1), and therefore in line with the center of the conically shaped beam, which is prevented from spreading by the action of its lens shape, which collimates the beam.

The Reflector directs the cone shaped wave at the inner wall of the pipe, from which it is reflected to a similar Reflector at the opposite end of the pipe (e.g., see second 103 in FIG. 1). The incident beam is then reflected axially into a like segmented piezoelectric crystal (e.g., see second 120 in FIG. 1), creating a Receive signal. This signal can be analyzed to determine its time of travel from the time of its Transmission from the opposite side Transducer.

In an exemplary embodiment, the Reflectors 103 are integrated together into a single continuous piece comprising a cylindrical portion between the Reflectors 103.

While the Conically-shaped Beam angle can be controlled by the application of time delayed pulses into the segmented Transmit Transducer, to overcome the effects of Beam Blowing, it can be noted that, since there is only reflection in the sonic path, and no entry of the sonic beam into any structure other than the Medium in the pipe, there is no refraction, as there is in Steered Conical Beam Ultrasonic Flowmeters. Accordingly, the angle of the Beam is independent of the sonic propagation velocity of the Medium. Thus, this Flowmeter can be used in its same form for any Medium, liquid or Gas, typically, Water, Oil or Natural Gas, or any Medium whatsoever capable of supporting a sonic beam with the magnitude necessary to deliver a detectable Receive signal under the then current pressure and temperature. The Segmented crystal 120 permits varying the Transmission angle as necessary in accordance with the measured flow velocity to compensate for any effect of flow rate on the angle of both the upstream and downstream Beams as a consequence of Beam Blowing.

The Reflector (e.g., 103) described herein is for a condition in which the angle is 60 degrees, which is a preferred angle, although any angle that permits the Reflected Beam to engage the Transducer on the opposite side of the pipe spool in like manner, is permissible.

Accordingly, the Reflected Steered Conical Ultrasonic Flowmeter can be considered as a Universal flowmeter, capable of application to any medium, liquid or gas, and any bidirectional flow velocity.

The alternative Synthesized Conic Beam system produces the same result as the Reflect mode system, except that the angle of the beam is determined not only by the time delay between application of transmit pulses to the various crystal segments. However, in this case, the angle is also dependent on the sonic propagation of the medium in the pipe. Accordingly, the use of Beam Steering algorithms is applied to the correction of the resultant beam angle, so as to always be at the angle chosen as nominal, in addition to its use for Beam Blowing correction.

At least one embodiment of the invention is based on use of phase control, as will be described below, to control the angle of emission of an ultrasonic beam relative to the plane of the surface of an emitter of ultrasonic energy within an ultrasonic flow meter. The plane may be formed by an object into which such ultrasonic energy is introduced. For example, if the emitter is a piezoelectric element such as a piezoelectric crystal, the plane is the surface of the crystal. The emitter or reflector may also be a surface of either metal or plastic. In an exemplary embodiment, the sonic energy in the emitting surface travels in a direction normal to, and dependent on any delay in application of transmit energy to the various segments of the crystal, at some angle with the surface of the plane of the surface.

Embodiments of the invention described herein allow placement of insert ultrasonic transducers to permit a sonic beam to be directed at such an angle that the sonic beam arrives exactly on target to a receive transducer at all times and regardless of what the sonic propagation velocity of the medium happens to be, even if variable, and regardless of the flow velocity, Vf, and regardless of its proportion of the sonic propagation Vm of the medium.

FIG. 1 shows a cross section and end view of an exemplary Reflected Conical Beam Spool. The cross section shows the location of a piezoelectric crystal 120 within the flange 100 and facing into the medium, through which it imposes its emitted sonic beam onto a first Reflector 103, from whence the reflection develops a conical shape. While the crystal 120 is described herein as being segmented, in alternate embodiments of the invention, the crystal is not segmented. The conically shaped beam reflects off the inner wall of the pipe 102 towards a second Reflector 103 located at the opposite side of the spool, from whence it reflects into a second piezoelectric crystal 120, which receives the beam and converts it into an electronic signal capable of interpretation to determine the time of travel from the Transmit crystal to the Receive crystal.

Also installed within the Hub 107 of the flange 100, supported by Spokes 111, is a Stator 106, containing coils (e.g., see coils 212 of FIG. 10) capable of extracting magnetic energy from a field created by magnets (e.g., see 203 in FIG. 10) in a Rotor 108 located external to the Hub 107. The Rotor 108 extracts energy from the flow of the medium from Blades 110, which are turned by the flow stream against the resistance caused by the magnetic field produced by the coils in the Stator 106. The Rotor 108 is placed on a Shaft or Rod 104, and is magnetically attracted to the Stator 106. A Tether 109 is placed on the end of the Shaft 104 to prevent accidental separation of the Rotor 108 from close connection to the Hub 107. A Spacer 105 is also placed on the Shaft 104 to limit the magnetic force of attraction between the Rotor 108 and Stator 106.

The current generated in the coils (e.g., see 212 in FIG. 10) is delivered to an external Flow Computer 150 via wires 101 enclosed within one of the Spokes 111, by which means the ultrasonic transmit and receive signals are transported as well. The energy delivered is stored in a battery (e.g., see 503 in FIG. 11) within the Flow Computer 150 and used to operate all Flow Computer electronic circuits.

Figure 2:
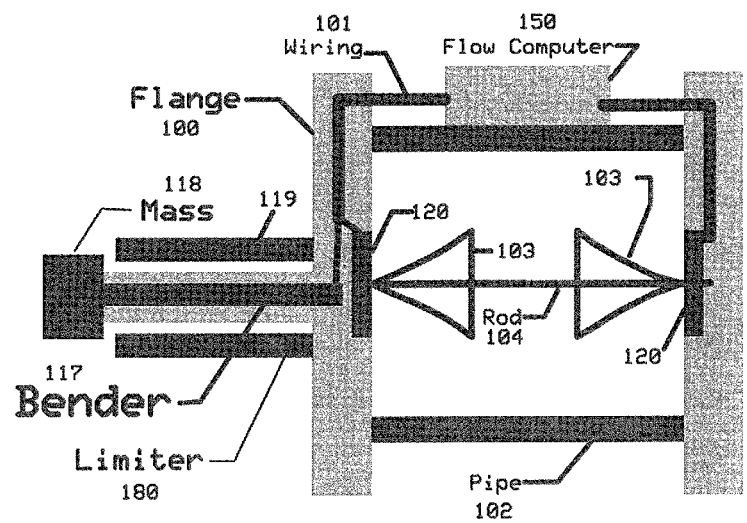
FIG. 2 illustrates a Reflect Mode Conic Beam ultrasonic flow meter Spool employing Piezoelectric means of extracting energy from the flowing stream, according to an exemplary embodiment of the invention.

FIG. 2 shows the use of an external piezoelectric Bender 117 to extract energy from the flow of the medium. The point of entry of the Bender 117 into the Hub 107 is sealed against intrusion of the medium into the Hub 107. However, the electric connections of the Bender 117 are within the Hub 107, from whence the derived voltage is delivered to the Flow Computer 150 in like means as in the case of the Electromagnetic method.

The Bender 117 extracts its energy by vibrating as an "over-center spring" in response to the passage of the flow stream. An obstructing mass 118 is located at the end of the Bender 117, which acts to oppose the flow so as to extract energy, and by its mass determine the frequency of vibration. As in the case of the Electromagnetic method, the energy derived is stored in a battery (e.g., see 503 in FIG. 11) for use by the electronic circuits. A limiter 180 may be located on one or more sides of the flange 100 to prevent the Bender 117 from bending too far in one direction.

Figure 3:
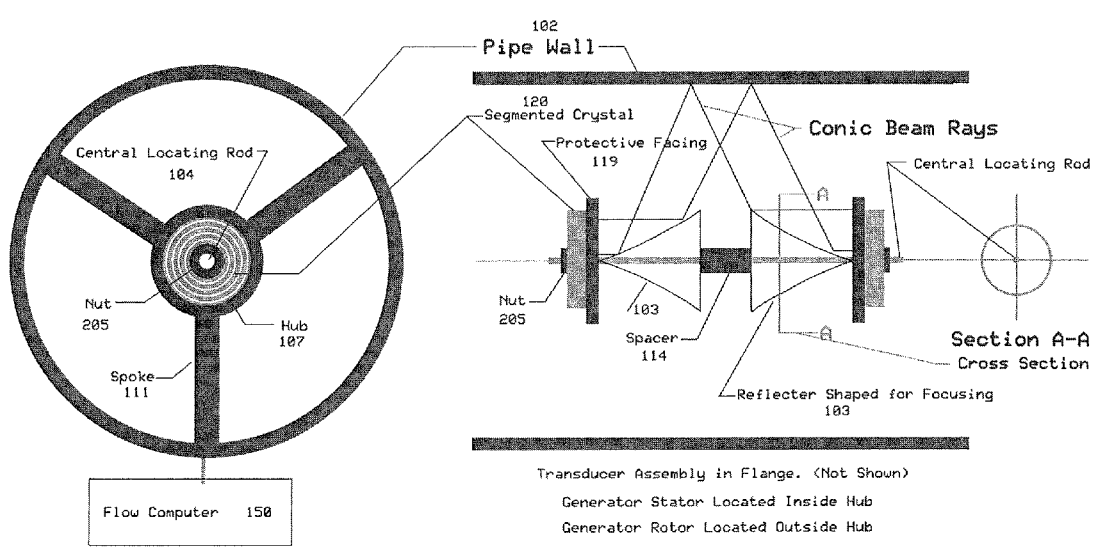
FIG. 3 illustrates the generation of a conically shaped ultrasonic beam caused by reflection of a Steerable sonic beam from a lens shaped Reflector.

FIG. 3 shows the path that the sonic beam travels in its travel from Transmit to Receive transducer. As shown, the distance between these transducers is controlled by a Spacer 114, in exemplary fashion. Alternatively such spacing may be determined by fabricating a one piece transducer, or by other means of affixing each transducer to the Rod 104. It also shows that the exposed face of the crystals 120 may be installed within a protective surface of plastic or very thin metal (i.e., protective facing 119). In an exemplary embodiment of the invention, the Reflectors 103 are preferably made of a material which has a significantly greater sonic impedance from that of the medium, so as to maximize the magnitude of the reflected sonic signal.

Also shown is that the curvature of each Reflector 103 is not linear, but curved. The shape of the curve will correct for the natural tendency of ultrasonic beam to diverge by focusing the beam as may be required due to the focal length of path between transducers and the number of wavelengths in the aperture of the crystal 120. The cross section of a Reflector 103 is also shown as being round. This serves to direct the beam in a conically shape at a preferred angle radially towards the inner pipe wall 102.

Shown in end view is the Hub 107 of the flange (e.g., see 100 in FIG. 1) within which the segmented crystal 120 is installed (also shown). The transducer wire 101 is shown emanating from a Spoke 111, where it is directed to the Flow Computer 150. The segmented crystal 120 may be secured to the rod 104 via a screw or a nut 205.

Figure 4:
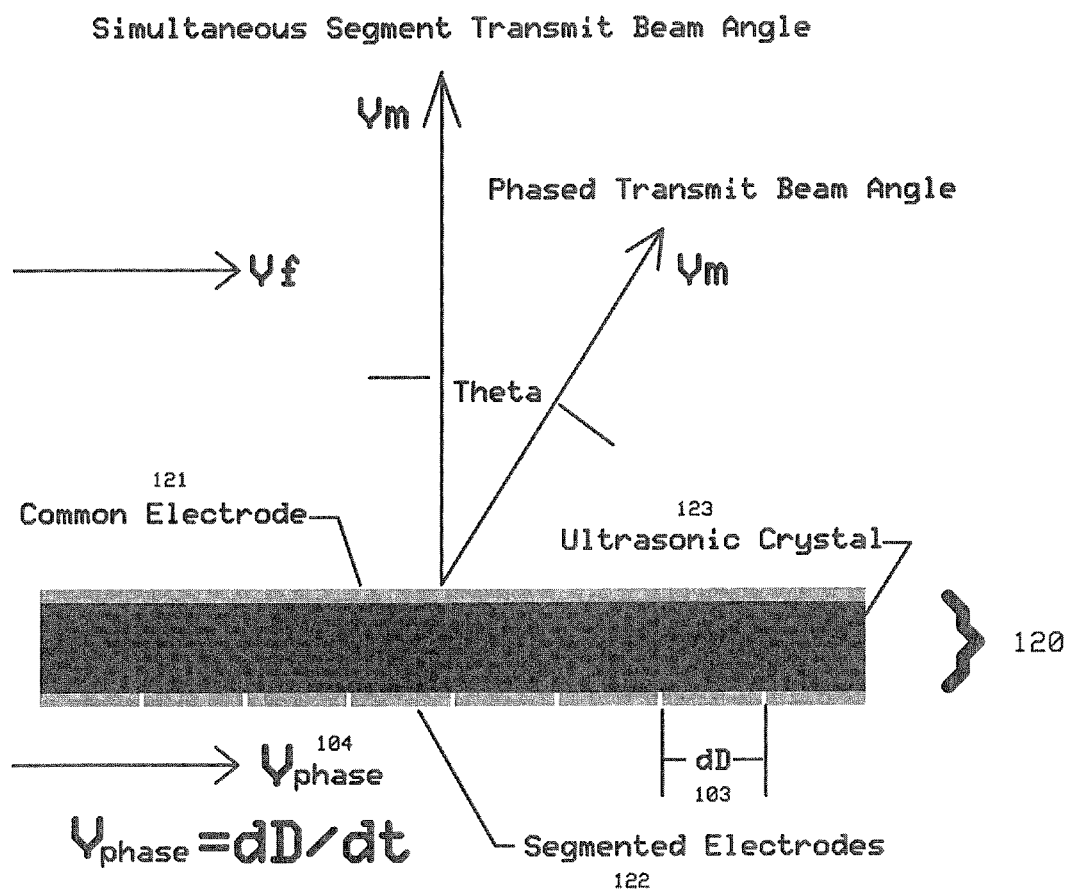
FIG. 4 illustrates a means of controlling the angle of emission of a sonic wave by control of the time delay between transmit pulses applied to adjacent Crystal Segments.

FIG. 4 shows the principle of Beam Steering. As shown, a rectangular crystal 123 has one side covered in full by an electrode 121, while the electrode on the other side is divided into electrically isolated segments 122. If all segments 122 are energized simultaneously, a sonic wave will be generated at right angles to the surface of the crystal 120. But, if the segments 122 are energized with a time delay between them, then the sonic wave will emerge at an angle "m" determined by Snell's law as shown by the following Equation 1:

$$\mathrm{Sin}(m) = \mathrm{Sin}(90 \text{ degrees}) \times Vm/Vphi \qquad \text{[Equation 1]}$$

where, m is the emergent angle, Vm is the sonic propagation velocity of the medium in the pipe, Vphi is the apparent velocity of the sequence of energizing adjacent segments=ds/dt, where ds=distance between segments and dt=the time delay between energizing adjacent segments 122.

Figure 5:
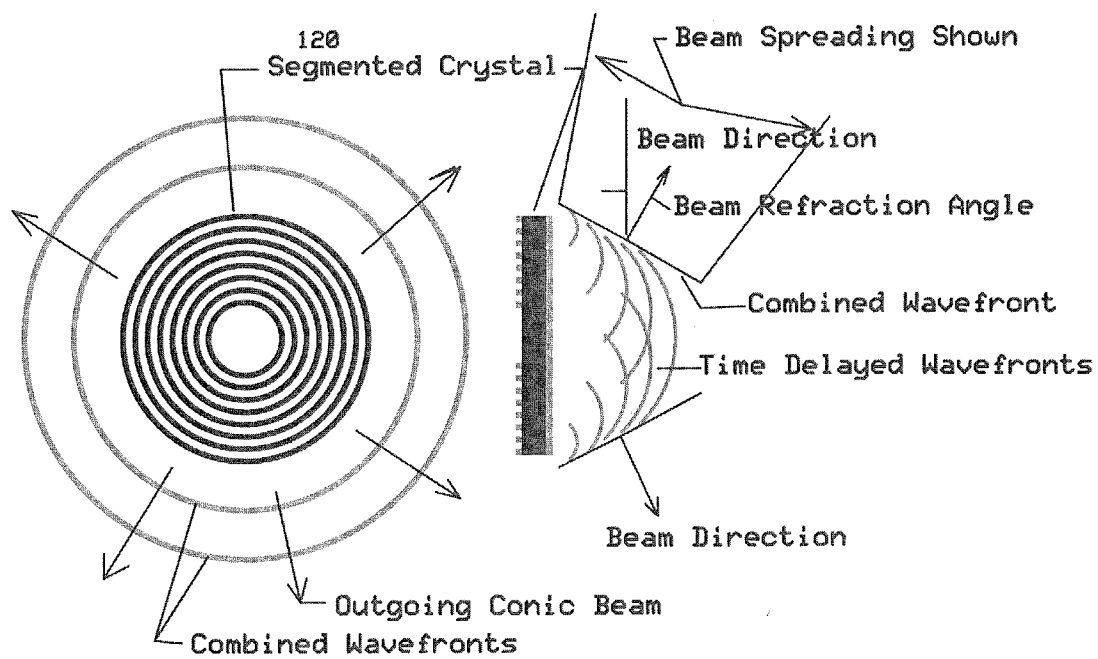
FIG. 5 illustrates a Conical Sonic Beam synthesized by a circular segmented ultrasonic crystal according to an exemplary embodiment of the invention.
Figure 6:
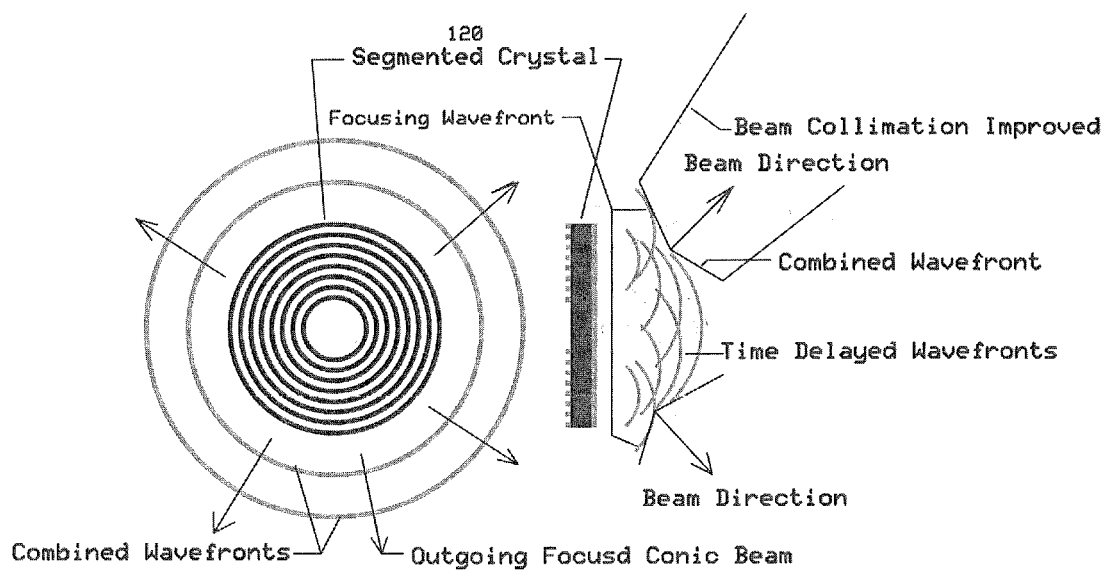
FIG. 6 illustrates a Focused Conical Sonic Beam synthesized by a circular segmented ultrasonic crystal according to an exemplary embodiment of the invention.

FIGS. 5 and 6 show how controlling the time delay between energizing successive crystal segments can be used to create a conically shaped ultrasonic beam emerging from a flat emitting surface. The end view shows a segmented circular crystal 120. The side view shows that if the center segment is energized first, and successively each next outer segment is energized, then a conically shaped wavefront emerges by the reinforcement of the beam at the position of each wavefront. As shown, this wavefront travels outward in the shape of a cone at a unique angle determined by the time delay imposed between energizing the adjacent segments. In other locations and directions the wavefronts emitted result in destructive interference. This method may be used without Reflectors or Refractive transducer elements, or with them as may be best suited to a particular application.

The time delay need not be equal between segments, as they can be adjusted non-linearly to effect focusing, or collimating, of the sonic beam. In addition, the nominal or average value of the time delay can be varied as may be necessary to control the beam angle to overcome the effect of change of refraction angle or beam blowing.

Figure 7:
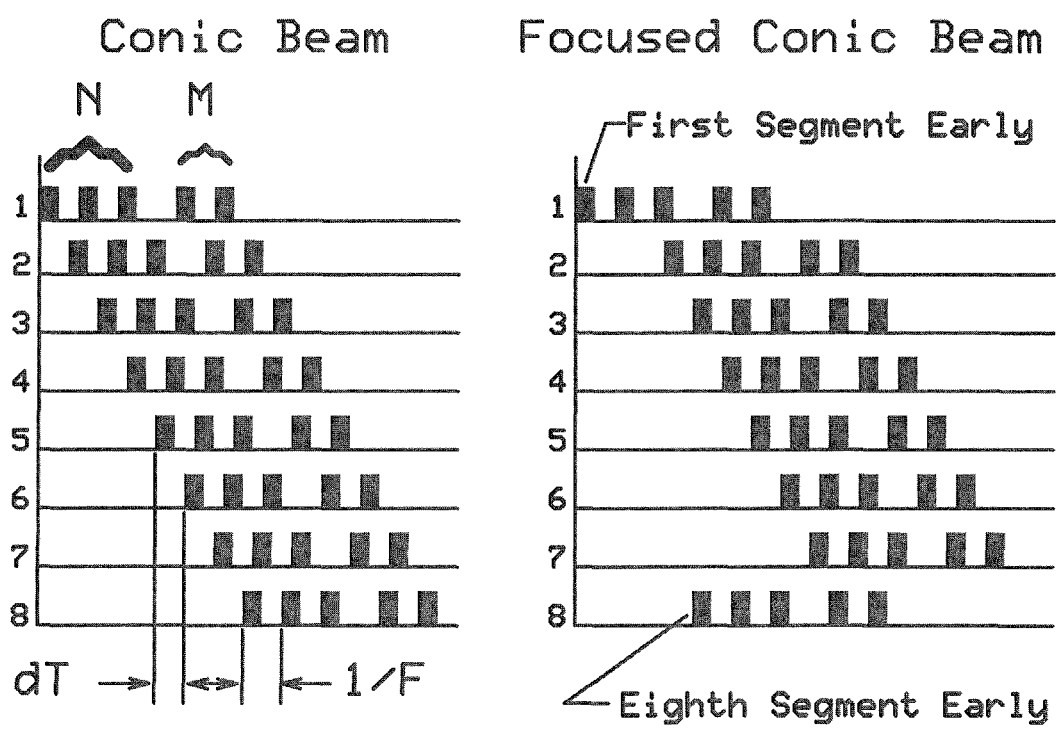
FIG. 7 illustrates the sequence of time delayed transmit pulses applied to a circular segmented ultrasonic crystal to synthesize a conical beam according to an exemplary embodiment of the invention.

FIG. 7 shows an exemplary Transmit Pulse sequence for an 8 segment crystal.

The sequence of 1 to 8 can be from right to left, or left to right on a rectangular crystal, or from inside to outside, or converse on a circular crystal to steer the beam in a positive or negative angular direction as required by the existing application requirements. The time delay between each segment's sequence of pulses need not be identical, nor do they all need to follow the same pattern, as may be needed to warp the nominally conical shape of the sonic beam. It is usual, however, to make the sequence of N pulses match the resonant frequency of the crystal, and the M pulses to arrive at such a time and frequency to damp residual vibrations in the crystal. The left timing diagram of FIG. 7 is an example of the pulses used to generate the conic beams shown in FIG. 5 and the right timing diagram of FIG. 7 is an example of the pulses used to generate the focused conic beams shown in FIG. 6. In the left timing diagram, the segments (e.g., 1, 2, . . . , 8) are energized in sequential order with a same delay therebetween. In the right timing diagram, the first segment is energized first, a first delay time elapses, then the $2^{nd}$-$7^{th}$ segments are sequentially energized with a second delay time therebetween smaller than the first delay time. However, rather than the $8^{th}$ segment being energized after the $7^{th}$ segment, it was energized early (e.g., before the $4^{th}$ segment and after the $2^{nd}$ segment.)

Figure 8:
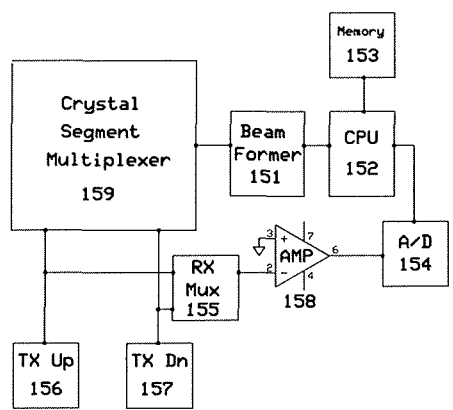
FIG. 8 illustrates the block diagram of a circuit capable of implementing the time delayed transmit pulses required to control the emission angle of a focused conical ultrasonic beam.

FIG. 8 illustrates the block diagram of a circuit capable of implementing the time delayed transmit pulses required to control the emission angle of a focused conical ultrasonic beam. Referring to FIG. 8, the circuit includes a multiplexer 159, a beam former 151, a CPU 152, a memory 153, an A/D converter 154, an upstream transmitter 156, a downstream transmitter 157, a receiver multiplexer 155, and an amplifier 158.

The circuit of FIG. 8 may be located within the Flow Computer 150, which is capable of implementing all described functions needed to effect creation and reception of ultrasonic beams created in the Spool and effect Beam Steering to normalize refraction and beam blowing effects. Additionally, the Flow Computer 150 may be capable of managing the collection, storage and distribution of electric energy derived from the flow stream or supplied from the electric mains. The Flow Computer 150 may include means for communicating wirelessly via Ethernet, Satellite, cell phone or Bluetooth, or where desired by serial or parallel wired ports. The Flow Computer 150 may also capable of providing direct analog outputs when required. Communication to the Flow Computer 150 to input or output setup data or diagnostic information may also be provided.

Figure 9A:
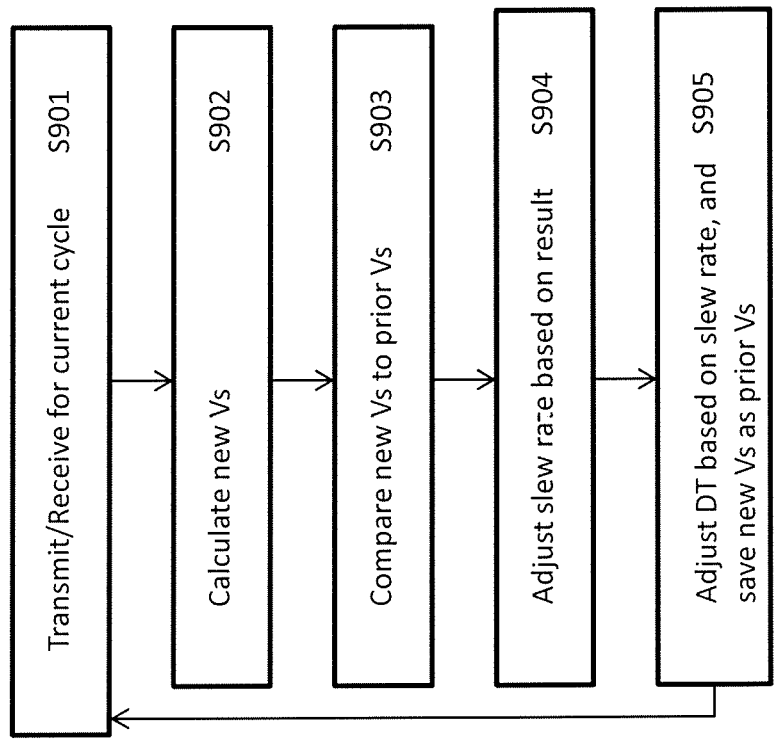

FIG. 9A shows the flow chart for a method according to exemplary embodiment of the invention to correct the angle of the sonic beam for changes in the refraction angle of the beam due to changes in sonic propagation velocity Vs of the medium, if the beam is subject to refraction. The method of FIG. 9A includes a pair of segmented transducers of one of the above-described flow meters being driven (S901). For example, segments of the upstream transducer are sequentially driven with a first delay time, and segments of the downstream transducer are sequentially driven with a second delay time. The method includes calculating the new medium sonic propagation velocity Vs as a result of the driving of the transducers (S902). The method then includes comparing the new Vs to a prior measured Vs (S903). Next, a slew rate is adjusted based on the result (S904). The slew rate indicates how much to increase or decrease the delay time DT between segments. The slew rate may be proportional to the difference between the new Vs and the prior Vs. For example, if the new Vs is close to the prior Vs, the adjustment to DT is small, and if the new Vs is far away from the prior Vs, the adjustment to DT is large. The procedure of FIG. 9A can be run several times until the flow meter has been properly compensated.

Figure 9B:
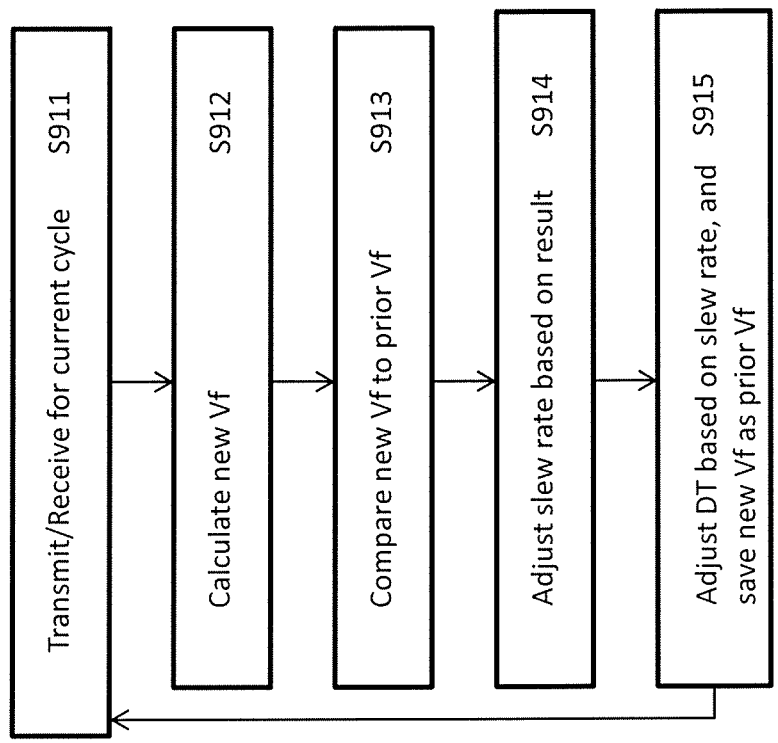

Correction for changes in upstream and downstream beam angles due to beam blowing is shown in FIG. 9B. The method of FIG. 9B includes a pair of transducers of one of the above-described flow meters being driven (S911). The method includes calculating the new flow velocity Vf as a result of the driving of the transducers (S912). The method then includes comparing the new Vf to a prior measured Vf (S913). Next, a slew rate is adjusted based on the result (S914). The slew rate indicates how much to increase or decrease the delay time DT between segments. The slew rate may be proportional to the difference between the new Vf and the prior Vf. For example, if the new Vf is close to the prior Vf, the adjustment to DT is small, and if the new Vf is far away from the prior Vf, the adjustment to DT is large. The procedure of FIG. 9B can be run several times until the flow meter has been properly compensated The effect of Beam Blowing on the path of the sonic beam, and how that path is corrected to follow the nominal angle $\Theta o$ can be understood with reference FIG. 9C. The foundation of the methods for compensation for any deviation of the sonic beam from following the angle $\Theta o$ caused by high flow rate or change in refraction angle can be best understood in recognizing that if a computation of the necessary correction angle for each possibility can only be correct if, when applied to the Beam Steering method, the next measurement of flow rate and sonic propagation velocity Vs of the medium, used in those methods, results in confirmation of the values applied in the method as expressed in the measured flow velocity Vf and sonic propagation velocity Vs. Accordingly, based on the last measurement of these parameters, the methods directs a change in the values used in the next measurement cycle to reduce or altogether eliminate any difference between the selected and next measured values of these factors.

It can be understood that associated with the Correction methods is a Smart Slew routine which determines the direction and magnitude of the change in the selected values of sonic propagation velocity Vs and flow velocity Vf to be applied in the next measurement cycle so as to make large corrections quickly and avoid instability and excessive data scatter when final values are approached. A method of control for slewing is based on the size of the correction needed, the measured rate of change of actual correction of sonic propagation velocity Vs and flow velocity Vf, and the history of reversal of correction direction, where reversals show that the correct value has been captured.

As may be seen on FIG. 9C, if the velocity of flow Vf has caused the center of the beam to move a distance Df, where the beam is blown to position Y or M from the target position of X, the Beam Steering method will direct the conic angle of the beam emerging from the segmented crystal to change so as to redirect the center of the beam to X again. To assure that the beam has tolerance for deviation, it is desired to make the beam wavefront slightly circular in shape, which is done by control of the time difference between application of transmit pulses to the adjacent crystal segments in a way calculated to create such a shape. This circular shape will be controlled so that it is always facing the same way that the beam angle is directed. As a consequence the shape of the signal generated by the Receive transducer is not aberrated by angular distortion of the received sonic beam, resulting in improved measurement accuracy.

A collimated conical beam will require different Up and Down transmit angles to assure that the beam displacement is compensated at high flow rates. This means that the act of compensation itself will cause insertion of false flow information that has to be removed by computation, with great uncertainty of result. In addition, the shape of the beam will change, since the Up and Down beams arrive at different angles relative to the Receive transducer. The fact that the beam is emitted at different times and different places within the radius of the Spool implies flow rate effects on changing the effective transmission angle of the beam. Accordingly, the only beam shape that will effectively not show significant displacement as the beam is blown, is one with an essentially Circular wavefront. This will result in there always being a beam at the right angle to reflect into the Receive transducer from the nominal center of refection on the pipe wall. The trick is to make the waveshape circular, but not to have it spread by more than is needed to assure that at the highest flow rate a significantly strong portion of the beam occludes the Receive transducer. What is nice about this method is that although the Up and Down beams are moved in opposite directions relative to the Receive transducer, their effective transmission angles are the same, and the calibration will be unaffected by either having the Transmission angle compensated for Beam Blowing Travel, or not. It would be best to Compensate, in this case, as all that has to be done is to keep the center of the beam pointed at the target Reflection point on the pipe wall. Since the shape of the waves can be Circular while their path can still be Conical, this solution is universal. Naturally, correction for Refraction angle change is still required to keep the beam pointing to where we want it, at the target Reflection point. The required Segment time delays will not be equal for this method, and must be calculated for each size spool and target nominal Vs. To correct for Beam Blowing it is necessary to calculate the value of Df, the linear distance that the nominal Reflection point of the Beam has been blown from its initial Zero Flow position (at X), arriving at angle Thetao. Then, the angle Thetau or Thetad needed to target the Transmission is computed so that its reflection point is either at Y or M for Downstream or Upstream compensation respectively. Once the Upstream and Downstream Transmission angles have been applied, the circular Beam Wavefront assures that even if it is off a little bit, the waveshape will be basically unchanged over the entire range of flow rates. More significantly, it may be assumed that regardless of what actual Thetau or Thetad is used, we can assume that the calibration angle will always be Thetao, in other words, unchanged over the entire flow range. This means that the actual Up and Down transmission angles can be tweaked to assure maximum Receive Signal amplitude, which would be a secondary way of selecting the up and down Transmission angles in the first place. It is assumed that the Refraction angle change, if present, has been separately corrected.

Referring to FIG. 9C, the parameter r is the radius of the spool (e.g., the pipe 102), the parameter L is an axial path length, the parameter Lt is the total length or length for synthesized conic beams, parameter Vst is a sonic propagation velocity of a transducer, parameter Vso is the sonic propagation velocity of a nominal medium, parameter $\Theta o$ is the nominal transmit angle at zero flow relative to the pipe axis, and is the nominal refraction angle of a refractive transducer at Vso, which is used to compute flow velocity Vf. The parameters may be used to compute various computed values.

A computed value TL is computed according to Equation 2 as follows:

$$TL = M'/Vf^*(\mathrm{Cos}(\Theta o)). \quad \text{[Equation 2]}$$

A computed value Df is computed according to Equation 3 as follows:

$$Df = TL^*Vf. \quad \text{[Equation 3]}$$

A parameter $V\theta$ is a Beam Steering Phase Velocity towards the Spool axis, which directs the beam towards the Spool center, lengthening the beam, and towards the Pipe Wall, which directs it radially, shortening the beam. A refraction angle $\Theta r$ caused by $V\theta r$ may be computed according to Equation 4 as follows:

$$\Theta r = A\,\sin(V\theta r/Vst). \quad \text{[Equation 4]}$$

The sonic propagation velocity Vsd in the downstream direction may be computed according to Equation 5 as follows:

$$Vsd = Vs + (Vf^*\mathrm{Cos}(\Theta o)). \quad \text{[Equation 5]}$$

The sonic propagation velocity Vsu in the upstream direction may be computed according to Equation 6 as follows:

$$Vsu = Vs - (Vf^*\mathrm{Cos}(\Theta o)). \quad \text{[Equation 6]}$$

The measured medium sonic propagation velocity Vs may be computed according to Equation 7 as follows:

$$Vs = (Vsu + Vsd)/2 = ((L/TLu) + (L/TLd))/2 \quad \text{[Equation 7]}$$

where TLu (e.g., L/Vsu) is the transit time in the upstream direction and TLd (e.g., L/Vsd) is the transit time in the downstream direction.

A parameter Kdt may be computed according to Equation 8 as follows:

$$Kdt = K(TLu - TLd) = 2^*L^*Vf^*\mathrm{Cos}(\Theta o)/((Vs + Vf\,\mathrm{Cos}(\Theta o)) \\ (Vs - Vf\,\mathrm{Cos}(\Theta o))). \quad \text{[Equation 8]}$$

Then parameter Vf may be computed according to Equation 9 as follows:

$$Vf = kVsdt/(2^*TL^*\mathrm{Cos}(\Theta o)) \quad \text{[Equation 9]}$$

Where an extra Vs compared to a clamp-on equation is due to correcting a reflection point to X from Y or M so as to be able to use $\Theta o$ to compute Dt.

Figure 9D:
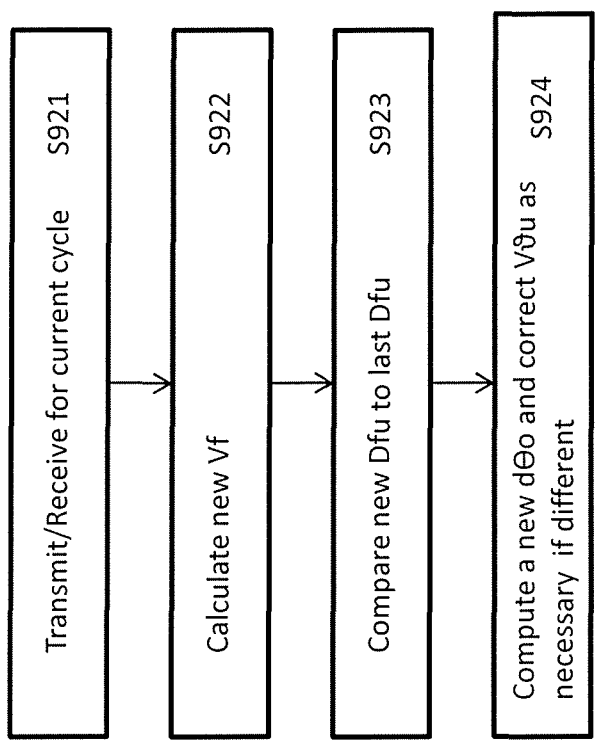

A beam blowing compensation method according to an exemplary embodiment of the invention is illustrated in FIG. 9D. The method includes completing a measuring cycle in the normal way using last derived values or seed values to start an operation (S921), measure the flow rate Vf (S922), and comparing new computed Dfu to last Dfu (S923). If the comparison indicates the new and last Dfu are different, the method computes a new $d\Theta o$ and corrects $V\theta u$ as necessary (S924). Steps S921-923 may be repeated for $V\theta d$ and then $V\theta$ smart slew rate is adjusted as necessary, and amplitude behavior is checked for Tu.

A refraction compensation method according to an exemplary embodiment of the invention includes comparing a newly computed Vs to a last Vs. If the comparison indicates the values are different, the method computes a $d\Theta o$ for a new Vs and corrects $V\theta r$. Then based on how the transmit compares to $\Theta o$, the refraction angle is adjusted. If the transmit was greater than $\Theta o$, then the refraction angle must be changed to be less axial, and if the transmit was less than $\Theta o$, then the refraction angle must be changed to be more axial. The change must be made in the same direction for both Tu, and both $V\theta r$ must be identical. The $V\theta r$ smart slew rate is adjusted as necessary.

Figure 9E:
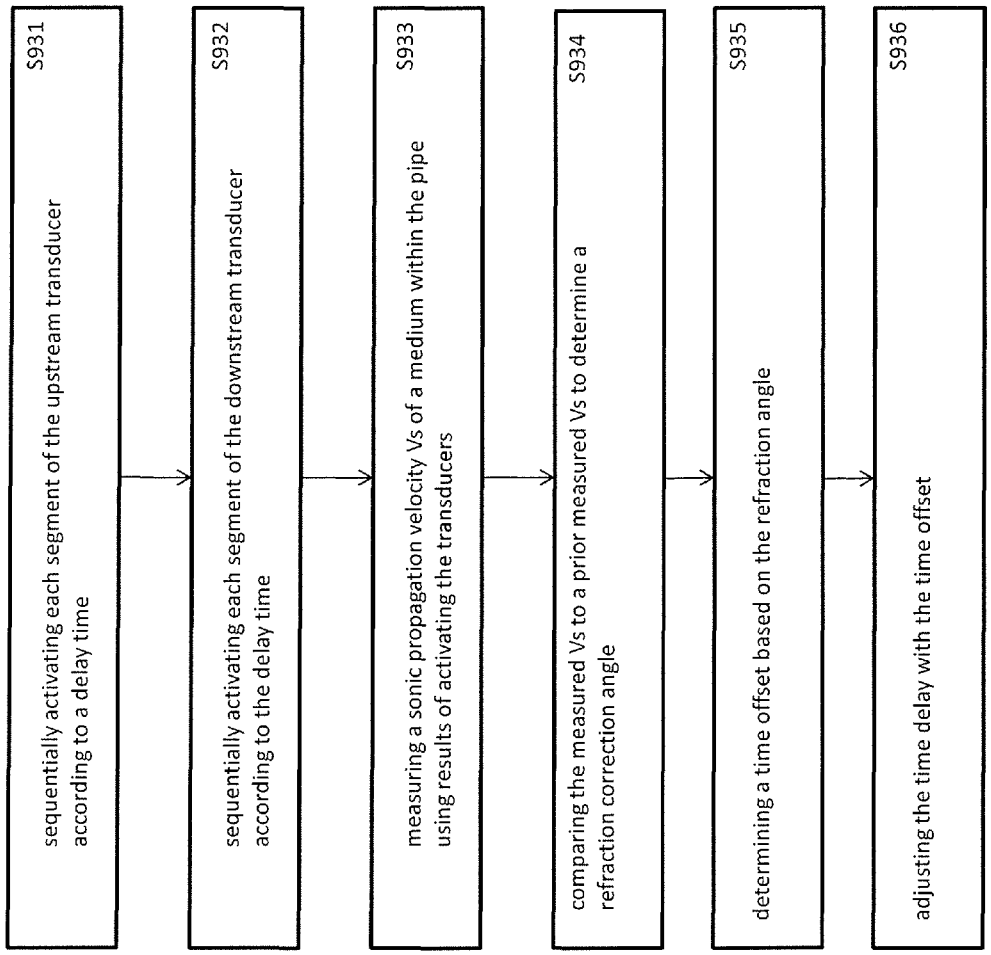

FIG. 9E illustrates a method of correcting sonic beams emitted by a flow meter within a pipe. The meter includes an upstream segmented transducer and a downstream segmented transducer. The method includes: sequentially activating each segment of the upstream transducer according to a delay time (S931), sequentially activating each segment of the downstream transducer according to the delay time (S932), measuring a sonic propagation velocity Vs of a medium within the pipe using results of activating the transducers (S933), comparing the measured Vs to a prior measured Vs to determine a refraction correction angle (S934), determining a time offset based on the refraction angle (S935), and adjusting the time delay with the time offset (S936). The method can be re-run several times until the time offset is small enough to indicate proper compensation. In each iteration of the method, the time offset may be reduced by a certain percentage.

Figure 9F:
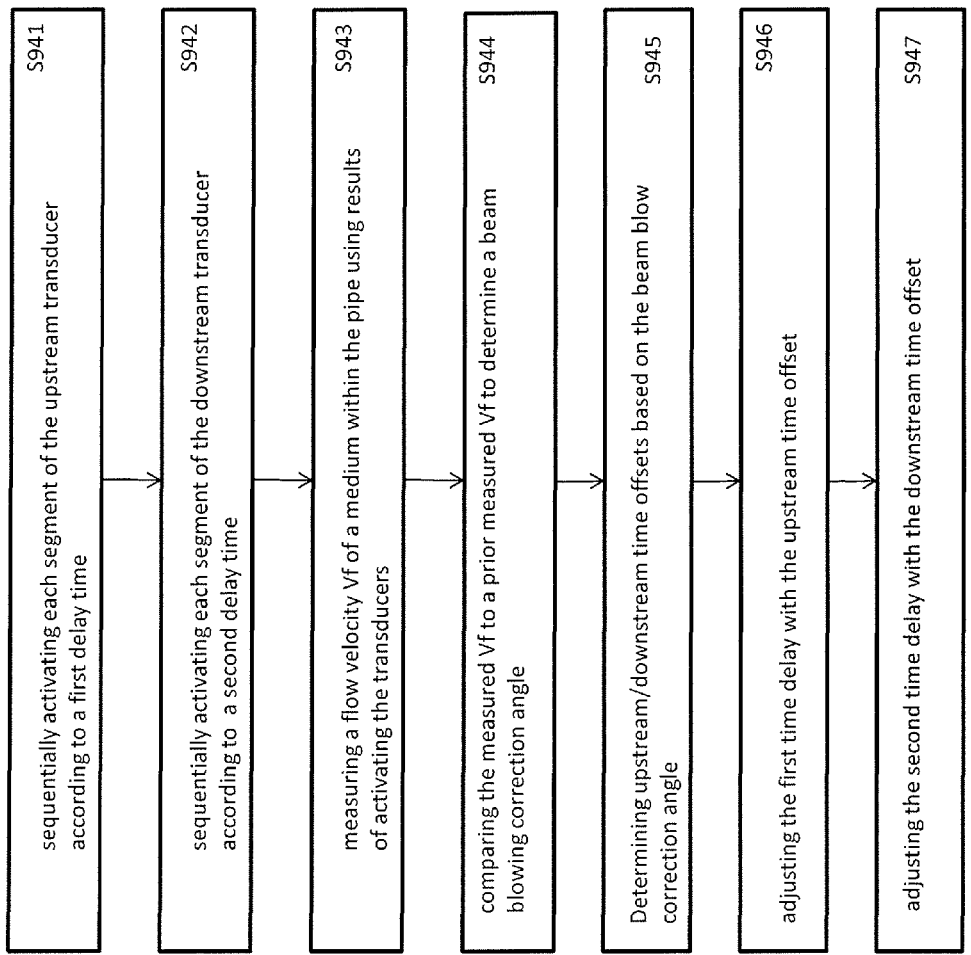

FIG. 9F illustrates a method of correcting sonic beams emitted by a flow meter within a pipe. The meter includes an upstream segmented transducer and a downstream segmented transducer. The method includes: sequentially activating each segment of the upstream transducer according to a first delay time (S941), sequentially activating each segment of the downstream transducer according to a second delay time (S942), measuring a flow velocity Vf of a medium within the pipe using results of activating the transducers (S943), comparing the measured Vf to a prior measured Vf to determine a beam blowing correction angle (S944), determining an upstream time offset and a downstream time offset based on the beam blowing correction angle (S945), and adjusting the first time delay with the upstream time offset (S946), and adjusting the second time delay with the downstream time offset (S947). In an exemplary embodiment, the upstream time offset and the downstream time offset have a same magnitude but are opposite in sign. The method can be re-run several times until the time offsets are small enough to indicate proper compensation. In each iteration of the method, the time offsets may be reduced by a certain percentage.

Figure 10:
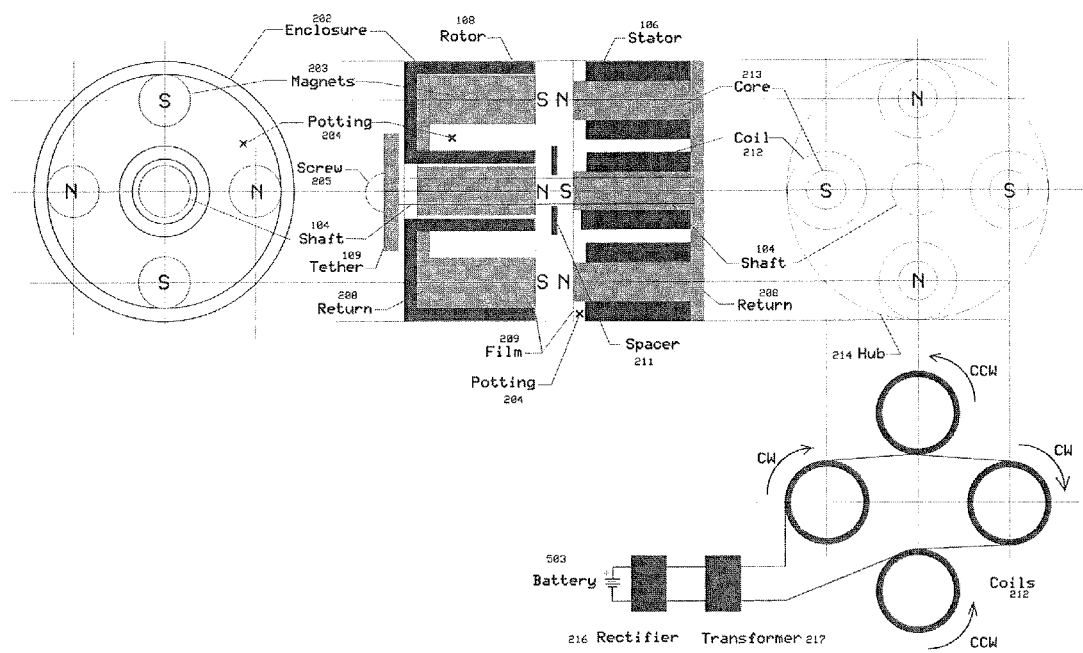
FIG. 10 shows the components within the Rotor and Stator which together comprise an electromagnetic Electric Generator which extracts energy from the flowing medium according to an exemplary embodiment of the invention.

FIG. 10 shows an Electromagnetic Generator comprising both the Rotor 108 and Stator 106 according to an exemplary embodiment of the invention. In an exemplary embodiment, the Rotor 108 includes four equally spaced magnets 203, arranged in alternate north and south orientations. The number of the magnets 203 may be increased or decreased, but only an even number of magnets may be used. In an exemplary embodiment, the magnets 203 are Neodymium magnets.

The surface facing the Stator 106 may be covered by either a plastic or non-magnetic metal sheet cover (e.g., see enclosure 202), thin enough not to limit the closeness of the magnets 203 to the Stator 106, further limited by the Spacer 211 between them which is located on the Shaft 104 on which the Rotor 108 is circumferentially installed. A magnetic material (e.g., return 208) of high permeability is placed on the back of the magnets 203 to increase the delivery of flux to a central return to the vicinity of the front of the magnets 203, thus increasing the flux to which the Coils 212 in the Stator 106 are exposed, increasing the voltage and current generation of the Generator. Each of the Coils 212 is wrapped around a core 213 (e.g., a ferromagnetic material such as iron). The Coils 212 are made out of a conductive material (e.g., copper). A cast holder, or similar means, may be provided to keep the rotational orientation of the magnets 203 in the Rotor 108 equally spaced.

Attached to the Rotor 108 are a number of blades which engage the flowing medium and cause the Rotor 108 to turn. Rotation of the field of the magnets 203 in proximity to the Coils 212 in the Stator 106 generates a current in the coils 212 which is passed up to the battery charging system (e.g., see 503 in FIG. 11) in the flow computer 150 by wires 101 embedded in a Spoke 111, avoiding any exposure of the wires 101 to the medium within the pipe 102. The magnitude of the voltage and current generated are proportional to the rotational velocity of the Rotor 108. However, both the magnitude of the voltage and current generated by the Generator are within the applicable safety codes.

In the stator 106, the Coils 212 are alternately wound clockwise and counterclockwise to correspond to the alternate phasing of the poles of the rotating magnets. Thus, rotation of the Rotor 108 causes an AC current to be developed in the coils 212, which in their alternating winding direction enables the generated voltage of all coils 212 to be added to each other, resulting in a net summation of all voltages. Use of a permeable material within the coils 212 and as a return for the flux from the rear of the coils 212 to the front of the coils 212 also aids in the efficiency of generating electric current from the rotation of the magnets 203 in the Rotor 108. The magnitude of the voltage may be further increased in the Flow Computer 150 by use of a transformer 217, to make battery charging more efficient. In an exemplary embodiment, the generation of voltage and current is within the Hub 107 of the flange 100, and never exposed to the interior of the pipe 102 or any other environment exposed to the collection of potentially hazardous gas or liquid. In an exemplary embodiment, the output of the transformer 217 is passed through a rectifier 216 before it is output to the battery 503. For example, since the electromagnetic and piezoelectric generators product an alternating current (AC) voltage, the rectifier 216 is used to convert the AC to a direct current (DC) voltage.

A potting material 204 such as a thermo-setting plastic or a silicone rubber gel may be deposited in the spaces between each core/coil pair in the stator 106 to prevent the attraction force of opposite pairs (e.g., a North and a South) from bringing the opposite pairs into contact with one another. The same potting material 204 may be deposited in the spaces between each permanent magnet 203 in the rotor 108 to prevent the attraction force of opposite magnets (e.g., N and S) from bringing the opposite magnets into contact with one another. In an exemplary embodiment, the potting material 204 is an epoxy, which hardens when cured, so as to withstand high pressure within the spool. A screw or nut 205 may be used to attach the tether 109 to the shaft 104. A film 209 can be a thin plastic, such as DELRIN, or can be stainless steel, or any non-magnetic material that is environmentally acceptable for the internal conditions within the spool. The purpose of the film 209 is to contain the potting material 204, which fills all spaces interior to the rotor 108 and/or the stator 106.

While the flow induced generator of FIG. 10 may be used with any of the ultrasonic transducers that use refracted or reflected beams described above, it is not limited to only these types of flowmeters. For example, the flow induced generator may be used with any type of ultrasonic flowmeter that installs its transducers in the Flange assembly, or any other internal pipe structure.

Figure 11:
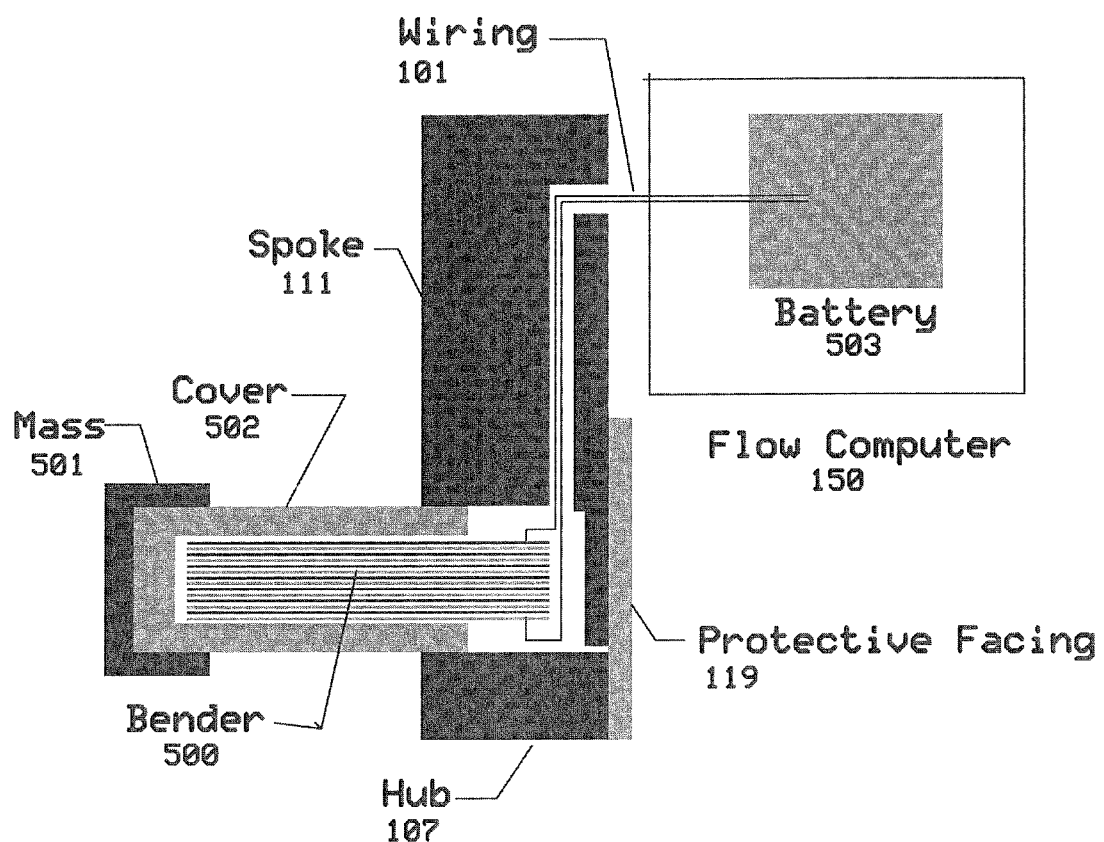
FIG. 11 shows a Piezoelectric Electric Generator which extracts energy from the flowing medium according to exemplary embodiment of the invention

FIG. 11 shows a Piezoelectric Generator according to an exemplary embodiment of the invention as an alternative to the Electromechanical Generator described in FIG. 10 above. Referring to FIG. 11, the generator is comprised of a piezoelectric bender 500 attached to the wires 101 that pass through a spoke 111 to the battery 503. A cover 502 is used to insulate the bender 500 from the medium. A mass 501 is attached to the cover 502, which may act to oppose a flow in the medium.

Figure 12:
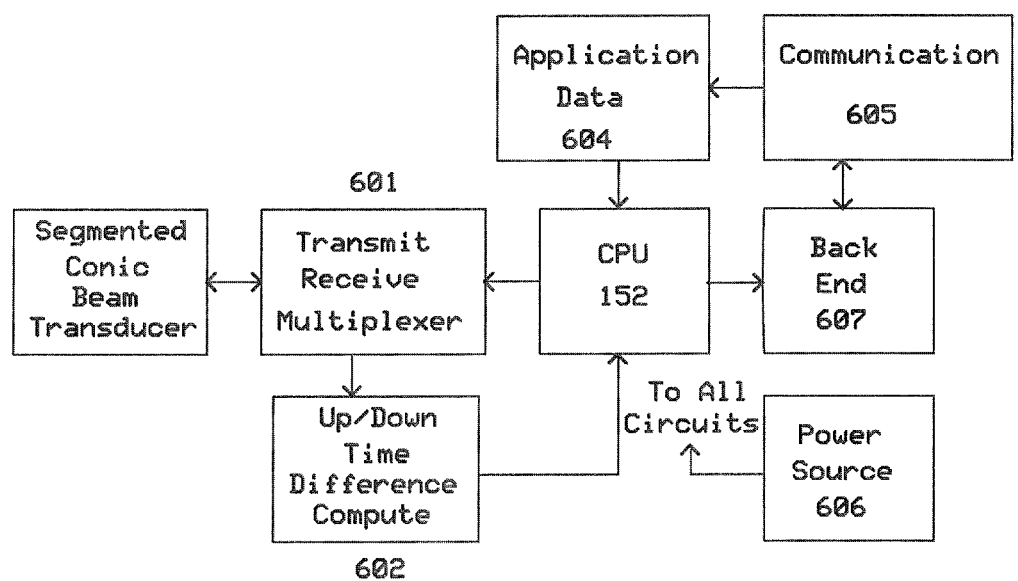
FIG. 12 shows the functional modules within the Flow Computer according to an exemplary embodiment of the invention.

FIG. 12 shows functional modules within an exemplary Flow Computer 150 according to an exemplary embodiment of the invention. When a segmented conic beam transducer (e.g., including one segmented crystal 120 and one reflector 103) is actively driven or receives a sonic signal from another transducer, it outputs a sonic signal to the transmit/receive multiplexer 601. An up/down time different compute unit 602 performs a calculation to determine a flow rate based on the received sonic signals and the flow rate is output to CPU 152. The CPU 152 may operate on application data 604 received from a communication unit 605. In an exemplary embodiment, the communication unit 605 includes one or more circuits that support two way communications of data signals and control signals via Bluetooth, Cellular, or wired serial/parallel communications protocols. The modules include a back end unit 607 and a power source unit 606 to provide power to each module. The back end unit 607 is for formatting data to be compatible with protocols of other remote systems.

It is understood that a wide variety of control and data indication functions may be provided which utilize the flow rate and application diagnostics developed by ultrasonic interaction with the flowing medium in the pipe, and its environmental conditions. Accordingly a wide variety of functions may be alternatively provided without in any way altering the novelty of the methods described to accurately measure the basic data provided by the Beam Steering and Conic Beam Shape generation disclosed herein.

Embodiments of an ultrasonic flow meter discussed above may be targeted at the distribution of natural gas, oil and water to commercial and residential users. The supply of these is provided by utilities that bill for the supply of products provided based on the best metrology available.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the disclosure.

What is claimed is:

1. An ultrasonic transducer for a pipe, the ultrasonic transducer comprising:
   an ultrasonic source configured to emit a sonic beam; and
   a conically shaped reflector configured to reflect the sonic beam towards an inner wall of the pipe, wherein an apex of the reflector opposite its base is mounted to the ultrasonic source.

2. The ultrasonic transducer of claim 1, wherein the conically shaped reflector has concave outer surfaces.

3. The ultrasonic transducer of claim 1, wherein a sonic impedance of the conically shaped reflector is different from a sonic impedance of a medium within the pipe.

4. The ultrasonic transducer of claim 1, further comprising a flange, wherein the ultrasonic source is mounted to the flange.

5. The ultrasonic transducer of claim 4, further comprising at least one substantially straight spoke that connects the ultrasonic source to an inner wall of the flange.

6. The ultrasonic transducer of claim 5, wherein the spoke conveys transducer signals into and out of the ultrasonic source, and energy derived from a flow stream within a medium of the pipe.

7. The ultrasonic transducer of claim 1, wherein the ultrasonic source comprises a plurality of electrode segments.

8. The ultrasonic transducer of claim 7, wherein the electrode segments include a plurality of ring shaped electrodes and a circular shaped electrode, wherein all of the ring shaped electrodes entirely surround the circular shaped electrode.

9. The ultrasonic transducer of claim 8, further comprising a control circuit that activates the electrode segments in a predetermined order to cause the ultrasonic source to emit the sonic beam, wherein each next electrode segment is activated after a delay time has elapsed resulting in a controllable sonic beam emission angle.

10. The ultrasonic transducer of claim 9, wherein all the delays times are the same.

11. The ultrasonic transducer of claim 9, wherein at least two of the delay times are different from one another.

12. The ultrasonic transducer of claim 9, wherein the order is a sequential order.

13. The ultrasonic transducer of claim 9, wherein the order is a non-sequential order.

14. The ultrasonic transducer of claim 4, further comprising
a rotor comprising magnets and outer blades; and
a stator comprising internal cores wrapped with coils, and the stator further comprising a protruding shaft,
wherein the shaft passes through a central opening in the rotor, and
wherein the stator is located within a hub of the flange.

15. The ultrasonic transducer of claim 14, further comprising a battery receiving power from a wire connected to the coils.

16. The ultrasonic transducer of claim 5, further comprising:
a piezoelectric bender that protrudes outside the spoke; and
a conductive wire connected to the bender.

17. The ultrasonic transducer of claim 16, further comprising a battery receiving power from the conductive wire.

18. An ultrasonic flow meter for a pipe, the flow meter comprising:
a first transducer comprising a first ultrasonic source configured to emit a sonic beam and a first conically shaped reflector configured to reflect the sonic beam towards an inner wall of the pipe, wherein a first apex of the first conically shaped reflector opposite a first base of the first conically shaped reflector is mounted to the first ultrasonic source; and
a second transducer comprising a second ultrasonic source and a second conically shaped reflector configured to reflect the reflected sonic beam towards the second ultrasonic source,
wherein a second apex of the second conically shaped reflector opposite a second base of the second conically shaped reflector is mounted to the second ultrasonic source, and
wherein the first base faces the second base.

19. The ultrasonic transducer of claim 16, further comprising a mass attached to a portion of the piezoelectric bender protruding outside the spoke that acts to oppose a flow of a medium within the pipe.

20. The ultrasonic transducer of claim 19, further comprises a cover, wherein an inner surface of the cover entirely surrounds the portion of the piezoelectric bender protruding outside the spoke, and the mass is attached to an outer surface of the cover.

21. The ultrasonic transducer of claim 1, further comprising a rod that penetrates through a central axis of the conically shaped reflector and the ultrasonic source.

22. The ultrasonic flow meter of claim 18, further comprising a spacer disposed between the first and second conically shaped reflectors in contact with the first and second bases.

23. The ultrasonic flow meter of claim 22, further comprising a rod that penetrates through a central axis of the first and second conically shaped reflectors and the spacer.

24. The ultrasonic flow meter of claim 23, wherein the rod further penetrates through a central axis of the first and second ultrasonic sources.

* * * * *